United States Patent [19]

Beaupre

[11] Patent Number: 5,002,650
[45] Date of Patent: Mar. 26, 1991

[54] BATH ELECTROLYTIC TREATMENT OF PLATING WASTE AND AN APPARATUS THEREFOR

[75] Inventor: Paul W. Beaupre, Leamington, Canada

[73] Assignee: Cyano Corporation, Detroit, Mich.

[21] Appl. No.: 455,963

[22] Filed: Dec. 21, 1989

[51] Int. Cl.$^5$ .......................... C25C 7/00; C25C 7/02
[52] U.S. Cl. .................................... 204/237; 204/238; 204/269; 204/273; 204/275; 204/277; 204/290 R; 204/294
[58] Field of Search ............... 204/237, 238, 269, 273, 204/275, 277, 290 R, 294

[56] References Cited

U.S. PATENT DOCUMENTS 3,966,567  6/1976  Pace et al. ............................ 204/275
4,179,347  12/1979  Krause et al. ........................ 204/275
4,399,020  8/1983  Branchick et al. ................... 204/275

Primary Examiner—T. Tung
Assistant Examiner—David G. Ryser
Attorney, Agent, or Firm—Flynn, Thiel, Boutell & Tanis

[57] ABSTRACT

A method and apparatus for the removal of metal ions and other contaminates from a contaminated liquid comprises introducing the contaminated liquid into a vessel having an inlet section, an electrode section having a plurality of anodes and cathodes and an outlet section. Agitation is provided in the inlet section and the outlet section and the contaminated liquid is continuously recirculated from the outlet section to the inlet section. The combination of high electrode surface area, vigorous air agitation and recirculation allows for the economical reduction of the contaminate level and the waste solution to extremely low levels in the minimum amount of time.

4 Claims, 6 Drawing Sheets

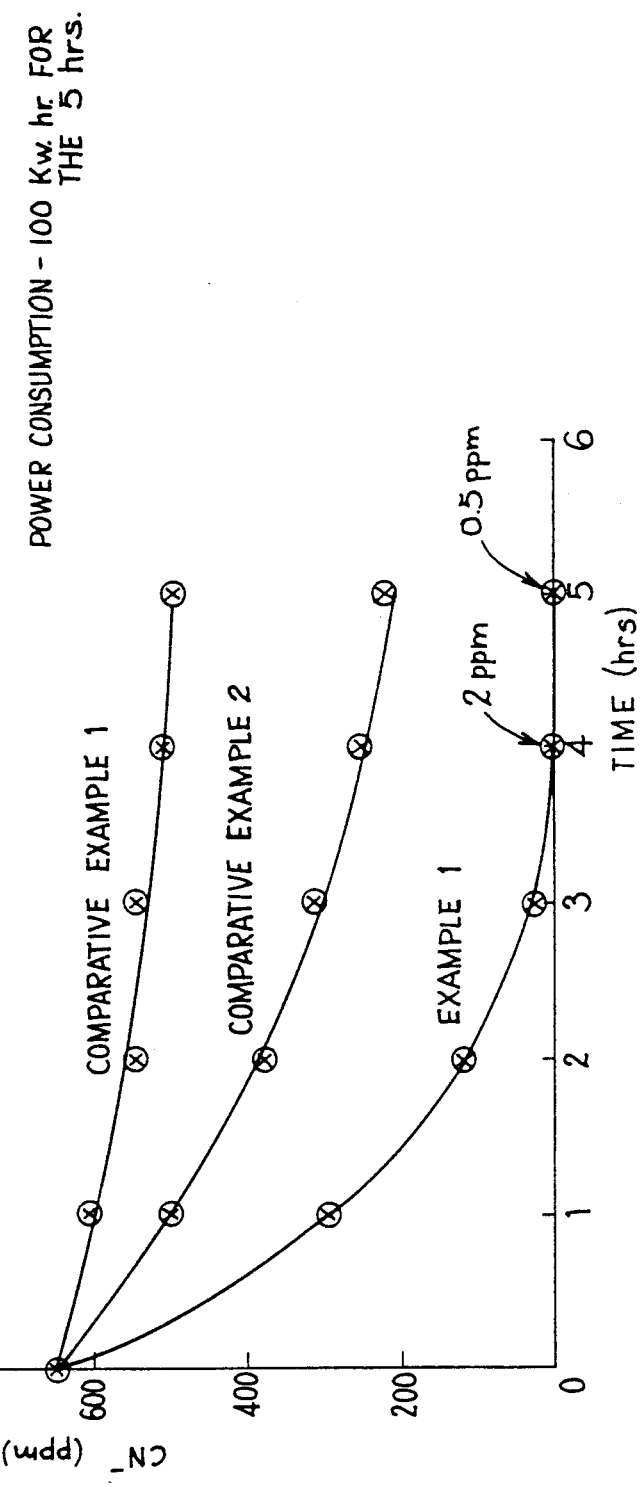

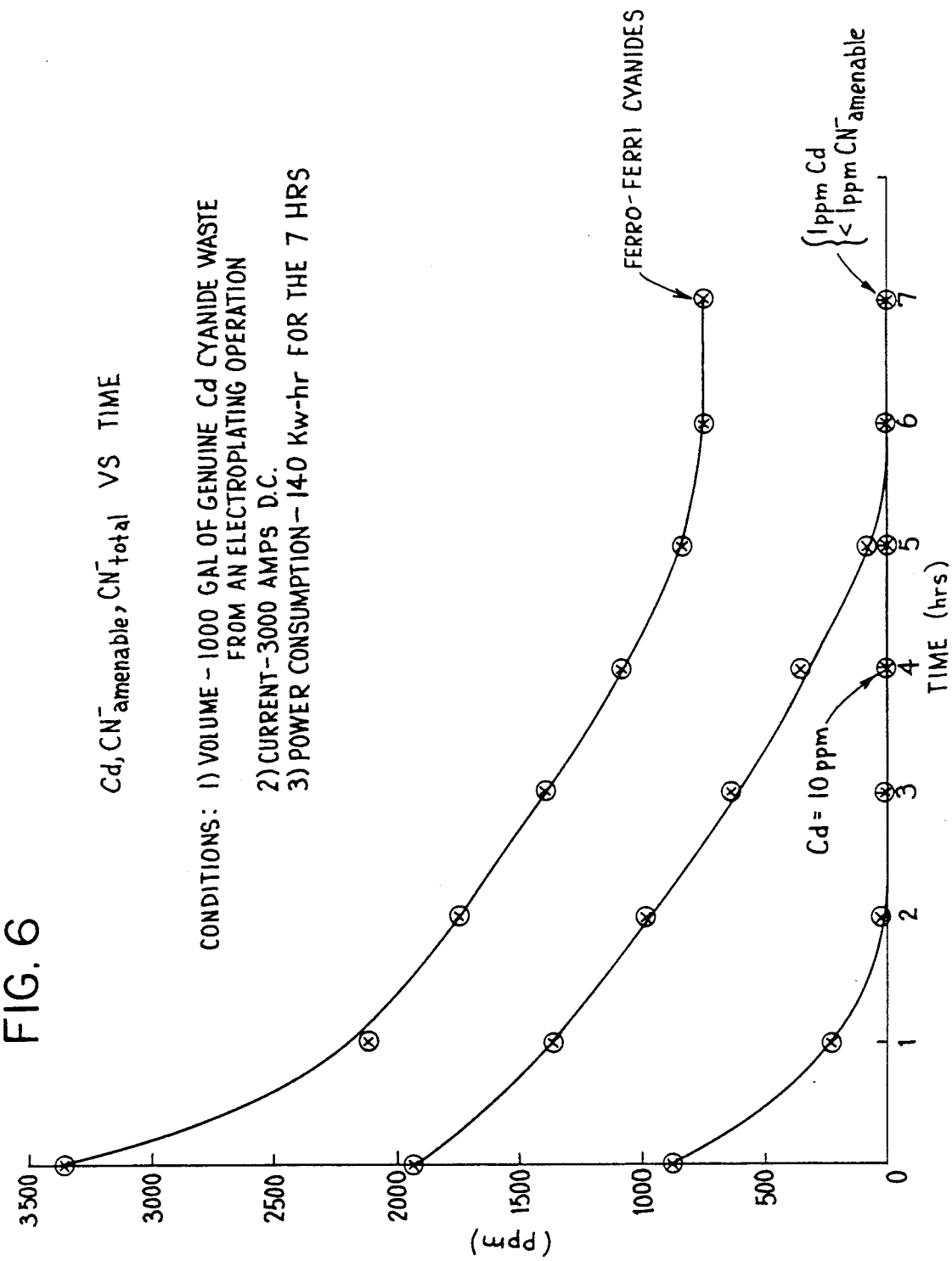

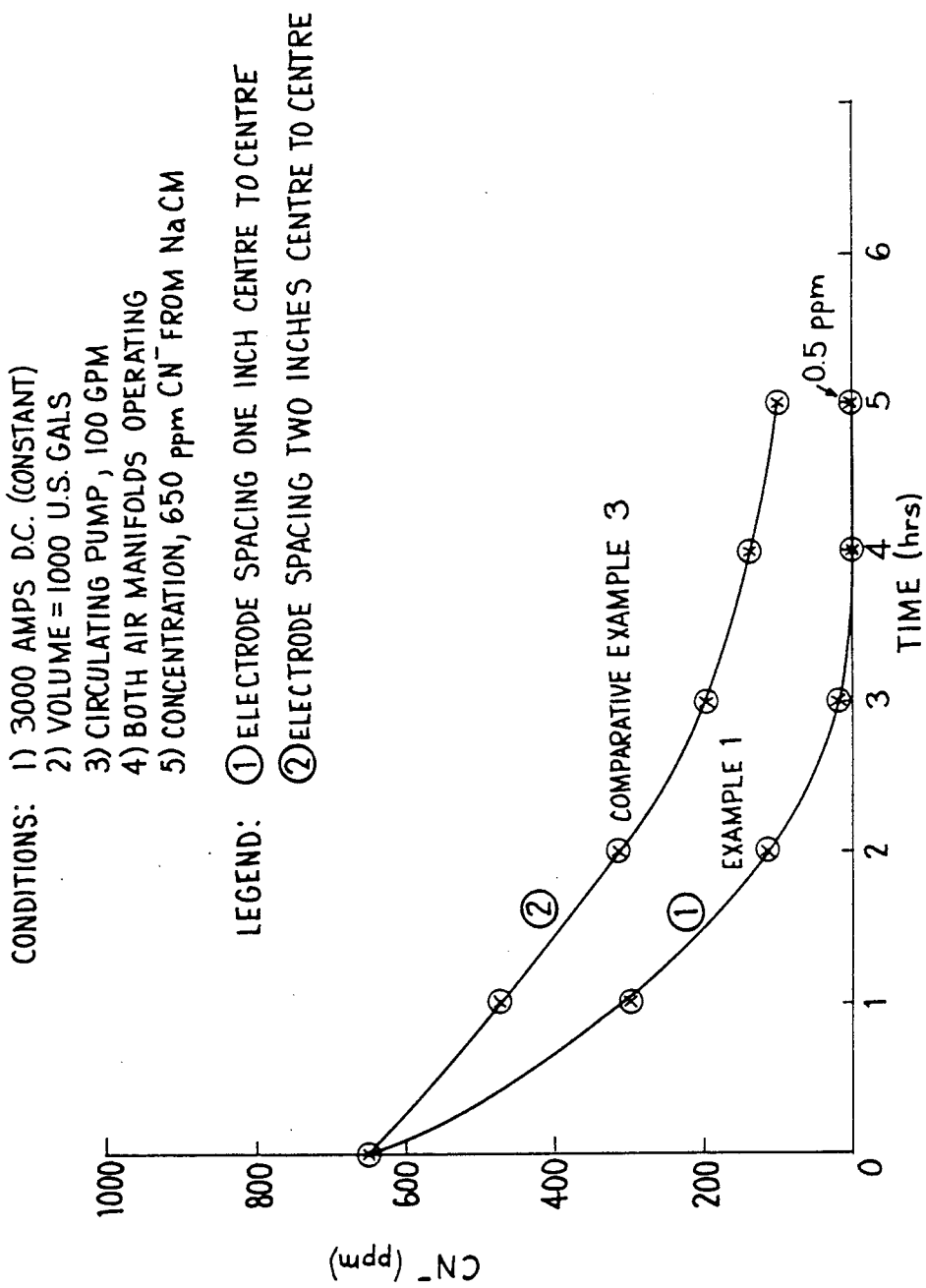

BATH ELECTROLYTIC TREATMENT OF PLATING WASTE AND AN APPARATUS THEREFOR

FIELD OF THE INVENTION

This invention relates to a method and an apparatus for reducing the metal ion and other contaminate content of a contaminated liquid. More particularly, it relates to a method and an apparatus for reducing the heavy metal and cyanide contents of a waste plating solution to extremely low levels, in a minimum amount of time, by treating the plating solution in an apparatus having a high electrode surface area, under vigorous air agitation, and with recirculation of the liquid being treated from an outlet section to an inlet section of the apparatus.

BACKGROUND OF THE INVENTION

In various industries, solutions are utilized or generated which contain metallic materials and other contaminates. For instance, in the metal plating industries, plating wastes are generated which typically contain heavy metals and cyanide. With the heightened environmental concerns that are prevalent today, disposal of these waste solutions has been a major problem.

With the amount of land available for industrial waste disposal decreasing, recent efforts have been directed toward treating the waste liquid to reduce the heavy metal and cyanide content thereof in order to produce a purified liquid which can be disposed of by ordinary means.

A common method currently used for removing heavy metals from solutions prior to their disposal is by chemical precipitation. This method has problems in that different metals precipitate under different conditions, particularly, at different pH levels. If more than one type of heavy metal is contained in the same waste stream, the optimum conditions for precipitation will often be different for the different metal ions. Additionally, chemical precipitation is of little, if any, benefit in reducing the non-metal contaminate content, such as cyanide content, of the waste stream.

Recently, a preferred method for reducing contaminates in a waste stream has been to introduce the waste stream into an electrolytic cell wherein the metal contaminates are deposited on one or more cathodes contained in the cell and the cyanide ions are oxidized at one or more anodes. However, electrolytic treatment of waste streams generates another set of problems. Specifically, in order to reduce the contaminate content of the waste stream to an acceptable level, it is necessary to perform electrolysis on the waste stream for a long period of time. Since the cost of energy is very high, the use of electrolysis to treat waste streams is not only time consuming, but also it can be relatively expensive. Additionally, the recovered metal has to be removed from the cathodes, and complicated cell designs result in extended periods during which the electrolytic cell cannot be used due to the removal, cleaning and replacement of the cathodes.

It is, therefore, a principal object of the present invention to provide a method and an apparatus for the batch treatment of a waste stream which reduces or eliminates the problems associated with prior art treatment methods.

It is a further object of the present invention to provide a method and an apparatus which economically reduces the contaminate content of a waste stream in a comparatively short period of time by utilizing an electrolytic cell of a specific configuration.

In the improved process and apparatus of this invention, there is provided a vessel or electrolytic cell having an inlet section, an electrode section having a plurality of anodes and cathodes in the form of graphite sheets, and an outlet section. Air agitation of the waste stream is provided at the inlet and outlet sections to cause turbulence in the waste stream being treated and to aid in the oxidation of the cyanide. The waste stream is continuously recirculated through the vessel by being removed from the outlet section, passed through a filter to remove any undissolved solids therefrom and then reintroduced into the inlet section. The combination of high electrode surface area, vigorous air agitation and recirculation of the waste stream enables the contaminate level of the waste stream unexpectedly to be reduced to an extremely low level in a short period of time. Additionally, the use of graphite sheets as the electrodes reduces the maintenance typically associated with electrolytic cells because the graphite sheets are extremely durable and they can be replaced with a minimum amount of down time.

Other objects and purposes of the invention will be apparent to persons familiar with apparatuses and processes of this general type, after reading the following specification and inspecting the accompanying drawings.

BRIEF DESCRIPTION OF THE DRAWINGS

FIG. 5 is a graph illustrating cyanide reduction with respect to time, using the present invention under different operating conditions;

FIG. 6 is a graph illustrating the removal of contaminates with respect to time, using the present invention; and FIG. 7 is a graph illustrating the effect of electrode surface area on the removal of cyanide.

Figure 1:
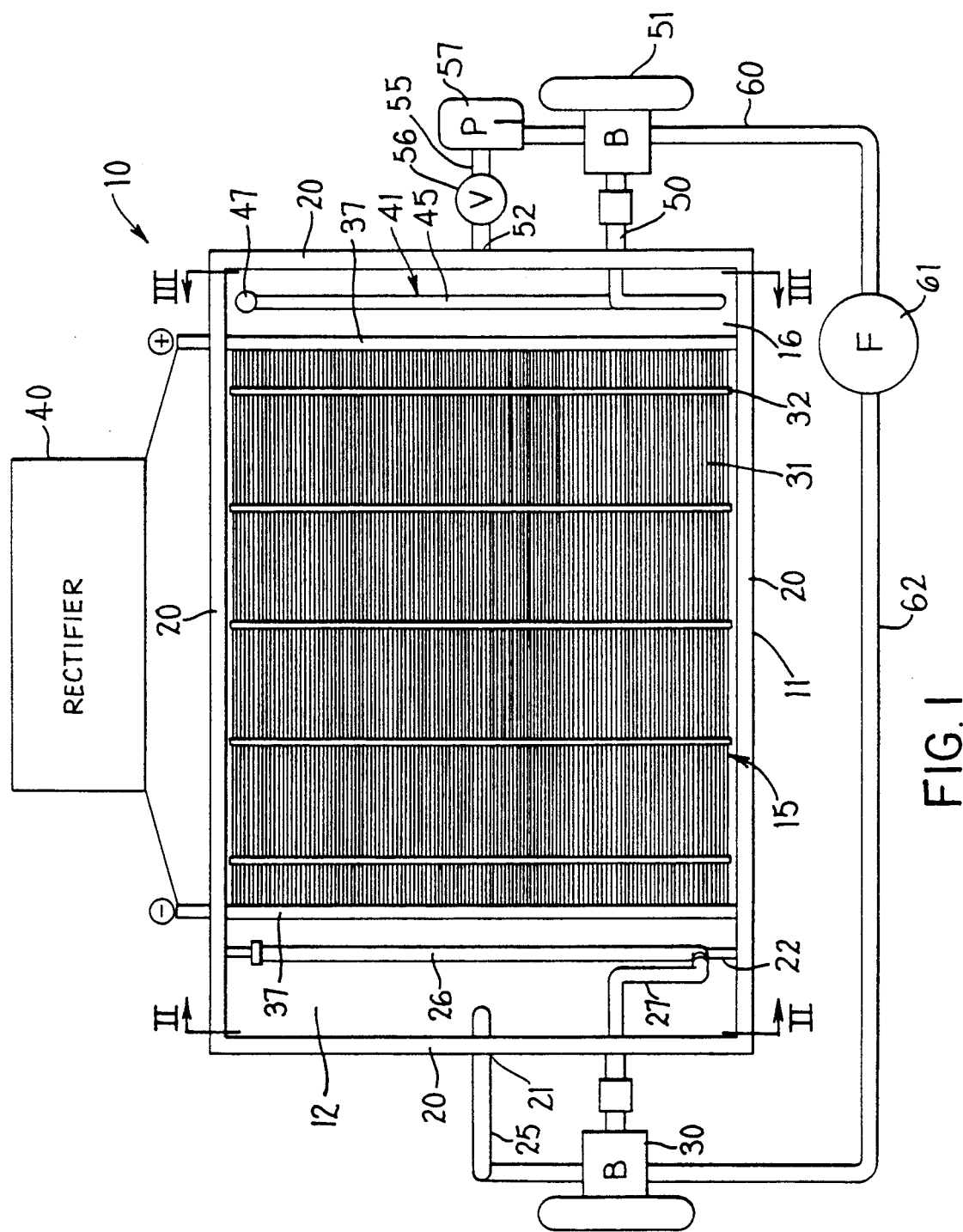
FIG. 1 is a plan view of the apparatus of the present invention taken along the line I—I of FIG. 2.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will also refer to directions toward and away from, respectively, the geometric center of the apparatus and designated parts thereof. Said terminology will include the words specifically mentioned, derivatives thereof, and words of similar import.

DETAILED DESCRIPTION

Figure 2:
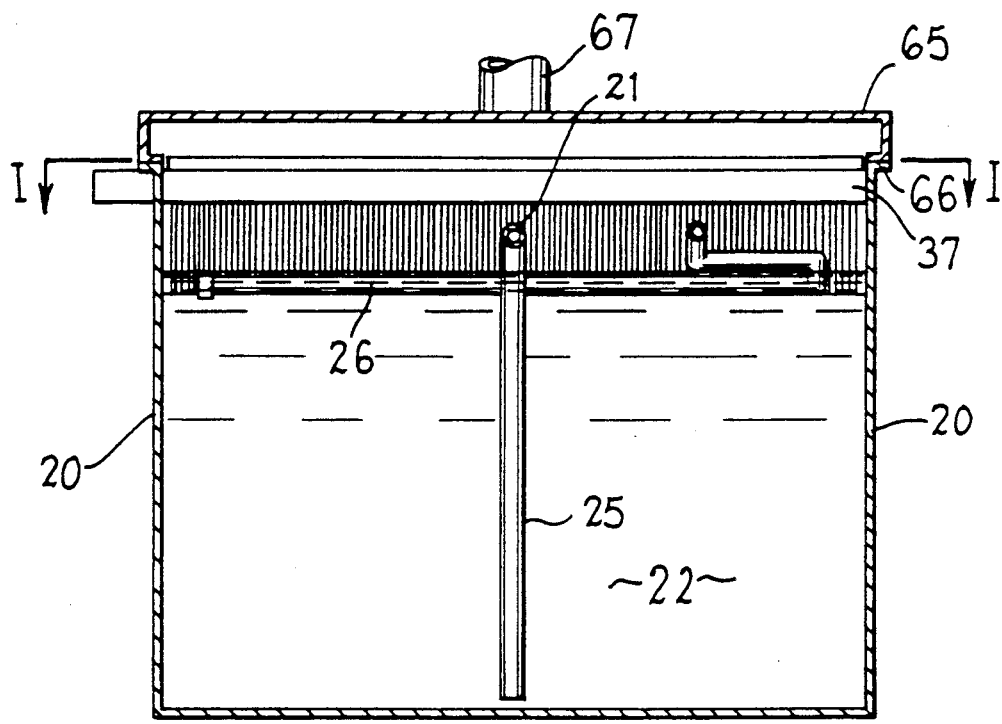
FIG. 2 is a sectional view of the electrolytic cell of the present invention taken along the line II—II of FIG. 1 and illustrating the fluid and air inlet arrangement.
Figure 3:
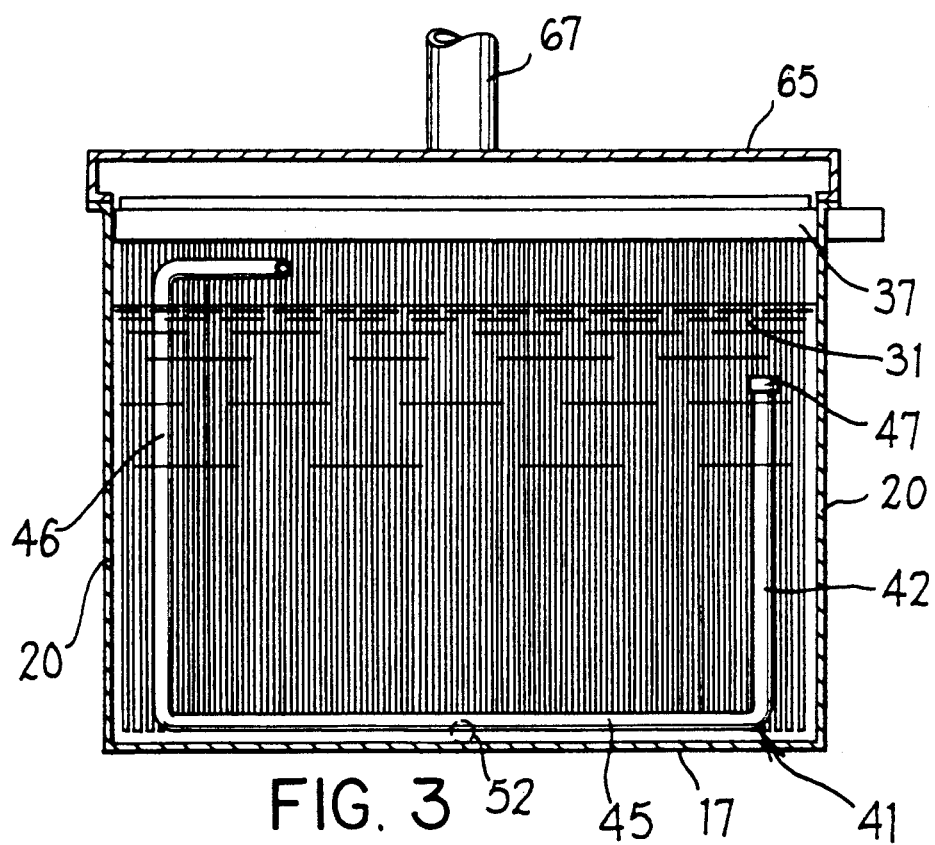
FIG. 3 is a sectional view of the electrolytic cell of the present invention taken along the line III—III of FIG. 1 and illustrating the air sparger arrangement and the fluid outlet section.

Referring to FIGS. 1-3, the apparatus 10 of the present invention comprises a vessel or electrolytic cell 11 having an inlet section 12, an electrode section 15 and an outlet section 16. The vessel has a bottom wall 17 and a plurality of side and end walls 20 for retaining the liquid being treated therein. The vessel can be made of any suitable material which is stable to the environment of the liquid being treated, such as a corrosion-resistant plastic or metal.

As shown in FIG. 1, an inlet 21 for the liquid is provided in the end wall 20 that defines the leftward boundary of the inlet section 12. The inlet section 12 also has a weir wall 22 provided therein. The weir wall 22 extends upwardly from the bottom wall 17 of the inlet section 12 and extends completely across the width of the inlet section 12 from one side wall 20 to the other. As shown in FIG. 2, the weir wall 22 has a height which is less than the height of the side walls 20. The weir wall 22 may be affixed to the bottom wall 17 and/or the side walls 20 by any suitable method, such as welding or the use of an adhesive. An inlet conduit 25 extends downwardly from the inlet 21 and terminates close to the lower end of the inlet section 12 whereby the recirculated contaminated liquid introduced into the bottom of the inlet section 12 at a location outwardly of the weir wall 22.

A first air sparger 26 is attached to the top of weir wall 22 and is connected to a first air conduit 27 which extends through end wall 20 and is connected to a first blower 30. Perforations (not shown) are provided in the first air sparger 26 so that air from the first blower 30 can be bubbled or blown into the inlet section 12. The first air sparger 26 can be welded to the top of the weir wall 22 or fixed thereto by the use of U-bolts or any other suitable mechanical connectors.

Figure 4:
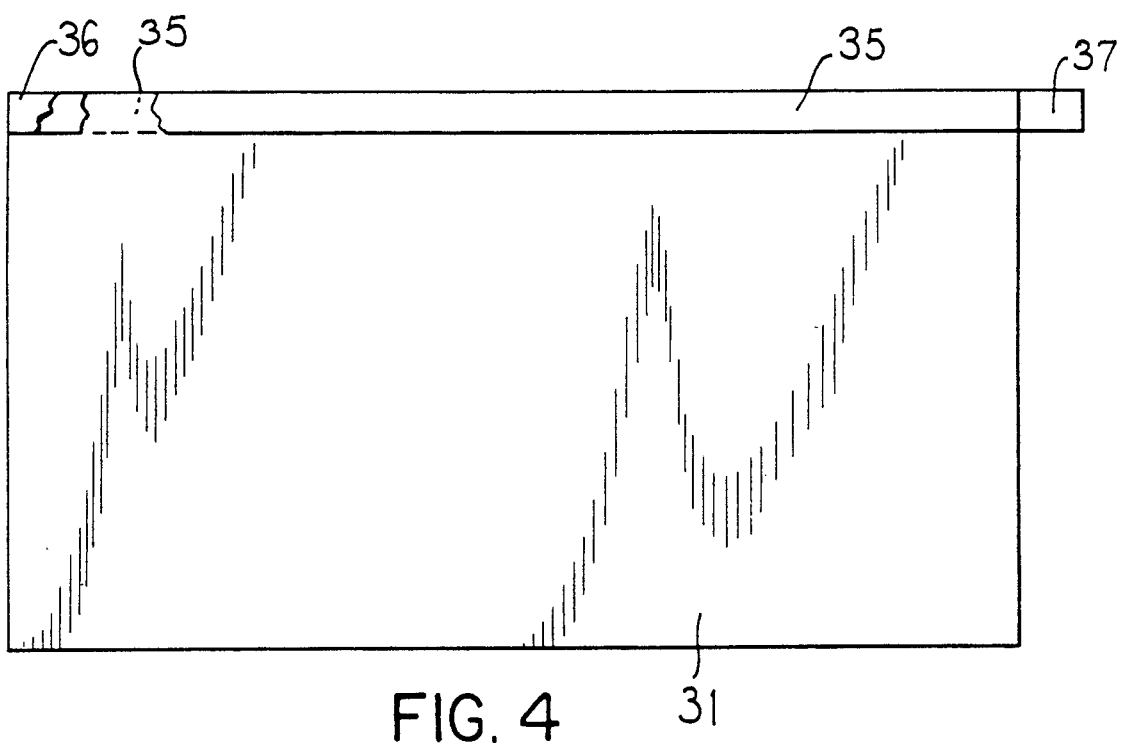
FIG. 4 is a partially broken-away, plan view of an electrode employed in the apparatus of the invention.

The electrode section 15 is defined by a multitude of closely spaced-apart, upright, parallel electrodes 31 which are maintained in the desired closely spaced-apart relation by spacers 32. The spacing between the electrodes 31 determines the number of electrodes 31 that are contained in an electrode section 15 of a given size and thereby determines the effective surface area of the electrodes 31 contained in the electrode section 15. The electrodes 31 are preferably made of a carbonaceous material, with graphite electrodes being especially preferred. As shown in FIG. 4, the carbonaceous electrodes 31 are provided in the form of sheets having copper strips 35 sandwiching the top edge portion of the sheets. In order to protect the copper strips 35 and prevent electrical contact between the copper strips of adjacent electrodes, a protective coating 36, such as a urethane coating, is provided on the copper strips 35. Adjacent electrodes are arranged and connected so that cathodes and anodes alternate with each other. The edges of the copper strips 35 contact bus bars 37 so that d.c. voltage can be applied across the adjacent electrodes 31. The bus bars 37 are connected to a source of direct current 40, such as a rectifier.

The electrodes 31 are arranged so that each electrode 31 is of opposite polarity from the adjacent electrodes on either side thereof. All of the electrodes 31 are identical and the change of an electrode from a cathode to an anode or an anode to a cathode can be effected by removing the electrode from the vessel 11 and reversing its position so that the end of the copper strip 35 makes contact with the opposite bus bar 37.

It is important that the electrodes 31 have a large effective surface area with respect to the volume of electrode section 15. A preferred ratio of the effective electrode surface area to the total volume of the electrode section 15 is from about 17 ft$^2$/ft$^3$ to about 28 ft$^2$/ft$^3$. An especially preferred ratio of effective electrode surface area to volume of the electrode section is about 21 ft$^2$/ft$^3$. As will be shown later, maintaining the ratio of the electrode surface area to electrode section volume within the above-described range is an important feature of the present invention. When the ratio of the effective electrode surface area to electrode section volume is below about 17 ft$^2$/ft$^3$, the time required for the reduction of the contaminate levels in the liquid being treated becomes unacceptably long and when the ratio of effective electrode surface area to electrode section volume is greater than about 28 ft$^2$/ft$^3$, the useful liquid treating time of the cell is reduced because of the frequent need to remove the plated metal from the cathodes.

The outlet section 16 is provided adjacent the end of the electrode section 15 opposite the inlet section 12. The outlet section 16 has a second air sparger 41 provided therein. As shown in FIG. 3, the second air sparger 41 has a short upright leg portion 42 extending vertically adjacent one side wall 20 of the vessel, a bight portion 45 extending horizontally adjacent to the bottom wall 17 of the vessel and a long upright leg portion 46 extending vertically adjacent to the opposite side wall 20 of the vessel. A cap 47 is provided at the top of the short leg portion 42 in order to prevent the discharge of air therefrom. The long leg portion 46 is bent horizontally near the upper end of the vessel and then is bent outwardly so that it extends through end wall 20. The leg portion 46 of the record air sparger 41 is connected to a second air conduit 50 which is connected to a second blower 51. Perforations (not illustrated) are provided in the bight portion 45 of the second air sparger 41 in order to allow air to be introduced into the outlet section 16 adjacent to the bottom thereof.

An outlet 52 for contaminated liquid is provided at a lower central portion of end wall 20 and serves as the means for discharging liquid from the outlet section 16. A first liquid conduit 55, having a valve 56 contained therein, extends between the liquid outlet 52 and the inlet of the pump 57. A second fluid conduit 60 connects the discharge of the pump 57 with the inlet of the filter 61. The outlet of the filter 61 is connected to the inlet conduit 25 by means of a third fluid conduit 62.

A removable cover 65 is provided for vessel 11 and it rests on flanges 66 provided on the side and end walls 20. An evacuation conduit 67 is provided in the cover 65 for removing the air fed into the vessel by the blowers 30 and 51, as well as gases evolved due to the electrolysis of the contaminated liquid 13 in the cell.

The first and second air spargers 26 and 41 are effective to vigorously agitate and aerate the liquid being treated. This greatly improves the oxidation of the cyanide ions at the anodes of the cell.

The operation of the present invention will now be explained of the following examples and comparative examples.

EXAMPLE 1

Into an open-top vessel 11, according to the present invention, having a width of 62", a length of 122" and a depth of 49", was introduced a solution with a starting concentration of 650 ppm of cyanide derived from sodium cyanide. The electrode section 15 was 62" width×96" length×49" depth, so that its volume was calculated to be 168.78 ft$^3$. A total of 61 graphite sheet electrodes 31 were placed in the electrode section 15. The graphite sheet electrodes had a height of 48", a length of 96" and a thickness of ¼". The surface areas of the edges of the electrodes were disregarded in the calculation of the effective electrode area. Additionally, since 4" coated copper strips were provided along the top edge of each graphite sheet, the effective electrode height was reduced to 44". Using the height of 44" and a length of 96" for both faces of the electrode, the electrode effective area was calculated to be 58.67 square feet per electrode. With 61 electrodes, the ratio of total effective electrode area to the volume of the electrode section 15 was calculated to be 21.2 ft$^2$/ft$^3$.

Air was introduced into the spargers 26 and 41 located in the inlet section 12 and the outlet section 16 at a rate of 400 cubic feet per minute each. The total volume of the cyanide-containing liquid introduced into the cell was 1,000 gallons and the rate of recirculation of the liquid was 100 gallons per minute. The dc current was 3,000 amps and the power consumed by the process was a total of 100 kilowatt hours for 5 hours operation in which the electrolysis was conducted. As shown in FIG. 5, by using the present invention, the cyanide content was reduced from 650 ppm to 0.5 ppm in 5 hours.

COMPARATIVE EXAMPLE 1

1,000 gallons of the same solution containing 650 ppm cyanide derived from sodium cyanide was treated in an identical manner as in Example 1, with the exception that no air was introduced into the solution by the spargers 26 and 41 located in the inlet and outlet sections. As shown in FIG. 5, the cyanide content of the waste solution was reduced from 650 ppm to only 500 ppm in 5 hours.

COMPARATIVE EXAMPLE 2

1,000 gallons of the same solution containing 650 ppm cyanide derived from sodium cyanide was treated in the identical manner as in Example 1, with the exception that 400 cubic feet per minute of air was introduced into the waste solution only through the sparger 26 located on the weir wall. No air was introduced by the sparger 41. As shown in FIG. 5, the cyanide content of the waste solution was reduced from 650 ppm to 225 ppm after 5 hours.

EXAMPLE 2

1,000 gallons of a cadmium and cyanide-containing waste liquid from an electroplating operation was introduced into the electrolytic cell of Example 1 and electrolysis was preformed thereon at 3,000 amps direct current for 7 hours. The power consumption for the 7 hours was 140 kilowatt hours. The waste liquid contained 875 ppm of Cd ion, 1900 ppm of amenable CN$^-$ ion and 3375 ppm of total cyanides. As shown in FIG. 6, the total cyanide was reduced from 3375 ppm to 750 ppm, the amenable CN$^{31}$ ion was reduced from 1900 ppm to less than 1 ppm and the cadmium content was reduced from 875 ppm to 1 ppm in 7 hours.

COMPARATIVE EXAMPLE 3

1,000 gallons of the same solution as the one employed in Example 1, containing 650 ppm cyanide derived from sodium cyanide, was treated in an identical manner as in Example 1 except that the electrode spacing was increased to 2" center to center so that only 31 electrodes were contained in the electrode section. The ratio of effective electrode area to the volume of electrode section was calculated to be 10.78 ft$^2$/ft$^3$. As shown in FIG. 7, the increasing of the electrode spacing from 1" to 2", center to center, greatly reduced the destruction of cyanide in the solution. Specifically, when using a ratio of an effective electrode surface area to electrode section volume of 10.78 ft$^2$/ft$^3$, the cyanide content of the solution was only reduced from 650 ppm to 100 ppm in 5 hours, as compared with the reduction of the cyanide content from 650 ppm to 0.5 ppm in 5 hours in Example 1.

The invention provides an improved destruction of free cyanide ions in the liquid being treated by oxidation at the anodes, but as expected ferro-ferri cyanide complexes are not as seriously affected. In FIG. 6, the cyanide remaining after 7 hours of electrolysis is bound with iron. Plateable metal contained in the liquid being treated will be deposited on the cathodes and it can be mechanically recovered from time to time as needed. Removing a small number of metal coated cathodes for metal recovery and replacing them with reserve electrodes on a suitable time basis avoids the production down time associated with removing all of the cathodes at one time. Alternatively, the metal-coated electrodes can be used as anodes in cyanide plating baths. This is particularly useful for plating shops which are recovering metal and destroying cyanide in waste rinse water solutions. The invention is applicable to liquids containing various metals, for example Cu, Zn, Au, Ag and Cd cyanide solutions. A buffer solution of ammonium carbonate at an approximate pH of 9 is obtained after electrolysis of cyanide solutions. Whether further treatment will be required prior to sewer discharge will depend on the electrolysis time, the absence or presence of iron cyanides and local, state and federal regulations.

Although particular preferred embodiments of the invention have been disclosed in detail for illustrative purposes, it will be recognized that variations or modifications of the disclosed process or apparatus, including the rearrangement of parts and process steps, lie within the scope of the present invention.

The embodiments of the invention in which an exclusive property or privilege is claimed are defined as follows:

1. An apparatus for the removal of metal ions and other contaminants from a contaminated liquid which comprises: a vessel for holding said contaminated liquid, said vessel having a bottom wall means and side wall means for confining said contaminated liquid therein; a contaminated liquid inlet and a contaminated liquid outlet provided opposed to each other in said side wall means; a weir wall positioned inside said vessel adjacent said contaminated liquid inlet and contained in a vessel inlet section provided between said contaminated liquid inlet and an electrode section; a plurality of anodes and cathodes provided adjacent said vessel inlet section and defining said electrode section thereby, each of said plurality of anodes and cathodes being in the form of a graphite sheet and said electrode section having about 21 ft$^2$ of effective electrode area per ft$^3$ volume; voltage means for imposing an electrical potential difference between said anodes and cathodes; a first air sparger for introducing air into said vessel, said first air sparger being affixed to an upper portion of said weir wall; a second air sparger for introducing air into said vessel, said second air sparger being contained within said vessel outlet section adjacent a lower portion thereof; recirculation means comprising a pump for removing said contaminated liquid from said vessel through said contaminated liquid outlet and reintroducing said contaminated liquid into said vessel through said contaminated liquid inlet; and a filter for removing undissolved solids from said contaminated liquid, said filter being provided in combination with said recirculation means.

2. The apparatus of claim 1, wherein an upper section of said graphite sheet is sandwiched between copper strips.

3. The apparatus of claim 2, wherein a protective urethane coating is provided on said copper strips.

4. The apparatus of claim 3 wherein said protective coating is an urethane coating.

* * * * *

UNITED STATES PATENT AND TRADEMARK OFFICE
CERTIFICATE OF CORRECTION

PATENT NO. : 5 002 650

DATED : March 26, 1991

INVENTOR(S) : Paul W. BEAUPRE

It is certified that error appears in the above-identified patent and that said Letters Patent is hereby corrected as shown below:

On the title page, item [54] and in column, line 1:
In the title, change "BATH" to ---BATCH---.

Signed and Sealed this

Twentieth Day of October, 1992

Attest:

DOUGLAS B. COMER

Attesting Officer

Acting Commissioner of Patents and Trademarks